Feb. 6, 1968     E. BRUNNER     3,368,054

APPARATUS FOR WELDING COMMUTATOR BARS

Filed May 20, 1965     2 Sheets-Sheet 1

United States Patent Office 3,368,054
Patented Feb. 6, 1968

3,368,054
APPARATUS FOR WELDING COMMUTATOR BARS
Ernst Brunner, Bassersdorf, Switzerland, assignor to H. A. Schlatter A.G., Schlieren, Switzerland
Filed May 20, 1965, Ser. No. 457,389
Claims priority, application Switzerland, May 22, 1964, 6,759/64
9 Claims. (Cl. 219—78)

ABSTRACT OF THE DISCLOSURE

This invention comprises a welding machine for welding the ends of rotor coils to commutator bars. The machine includes a pair of upper electrodes and a pair of lower electrodes supported in diametrically opposed relationship on arms mounted for movement both transversely of and parallel to the axis of the commutator supported between the electrodes. The upper and lower arms are arranged to be moved relative to each other for simultaneous welding of diametrically opposed commutator bars and welding current is supplied simultaneously to the upper electrodes and lower electrodes independently whereby the oppositely disposed welding pressures are approximately balanced.

---

This invention relates to apparatus for welding commutator bars and more particularly for welding the ends of rotor coils to the commutator bars. Welding apparatus for performing this operation are already known in the art. This has generally been accomplished by supporting the shaft end facing the commutator between clamping jaws which could be rotated in a bearing around their axis for moving into indexed positions corresponding to the subdivision of the commutator. At each indexed or notched position two electrodes are lowered on the commutator. The side of the bar facing the shaft end is pressed by one contact electrode while the side facing the coil is welded to at least one winding terminal by means of a welding electrode. It is necessary to support the rotor in order to prevent a shaft deformation which could occur during the welding operation due to the fact that the welding force is applied only ot one side, particularly in pressing against thin shafts.

In the novel apparatus of this invention a supporting of the shaft is not necessary. Furthermore, this apparatus provides a doubled production output because a welding of the upper and lower bar is carried out simultaneously. The clamped shaft end is substantially without pressing load because the welding force acts on the commutator simultaneously through the upper and lower electrodes. In the case of commutators with an uneven number of bars the commutator axis cannot lie in the geometrical plane defined by the four contacting points of the electrodes. Because in that case the electrode forces do not extend in the plane of symmetry in which the commutator axis is also located, but in a parallel plane which is removed from the symmetry plane by about one fourth of the width of the bar, a small force component is produced which extends perpendicularly to this plane and which is supported by the clamping device. During welding a small disadvantage is produced in that with the welding of the last point simultaneously the first point is welded once more, or that the lower electrodes are short circuited during the last welding operation.

The novel features and advantages of the invention will become apparent from the following description taken in connection with the attached drawing which illustrates an example of a commutator welding apparatus according to the invention. In the drawing.

Figure 1:
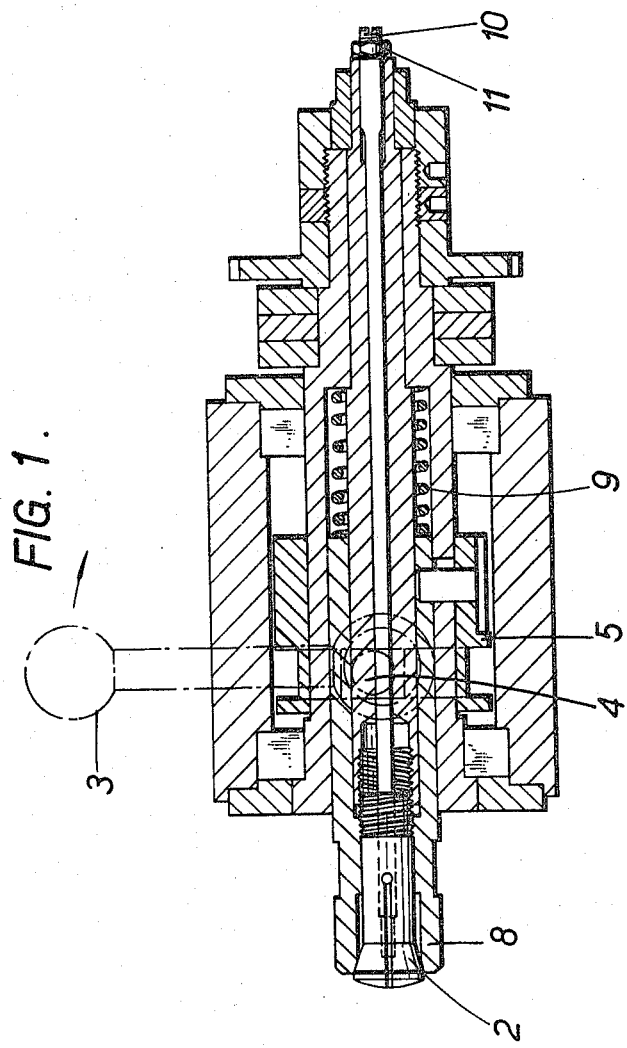
FIG. 1 shows a longitudinal section through the clamping device.
Figure 2:
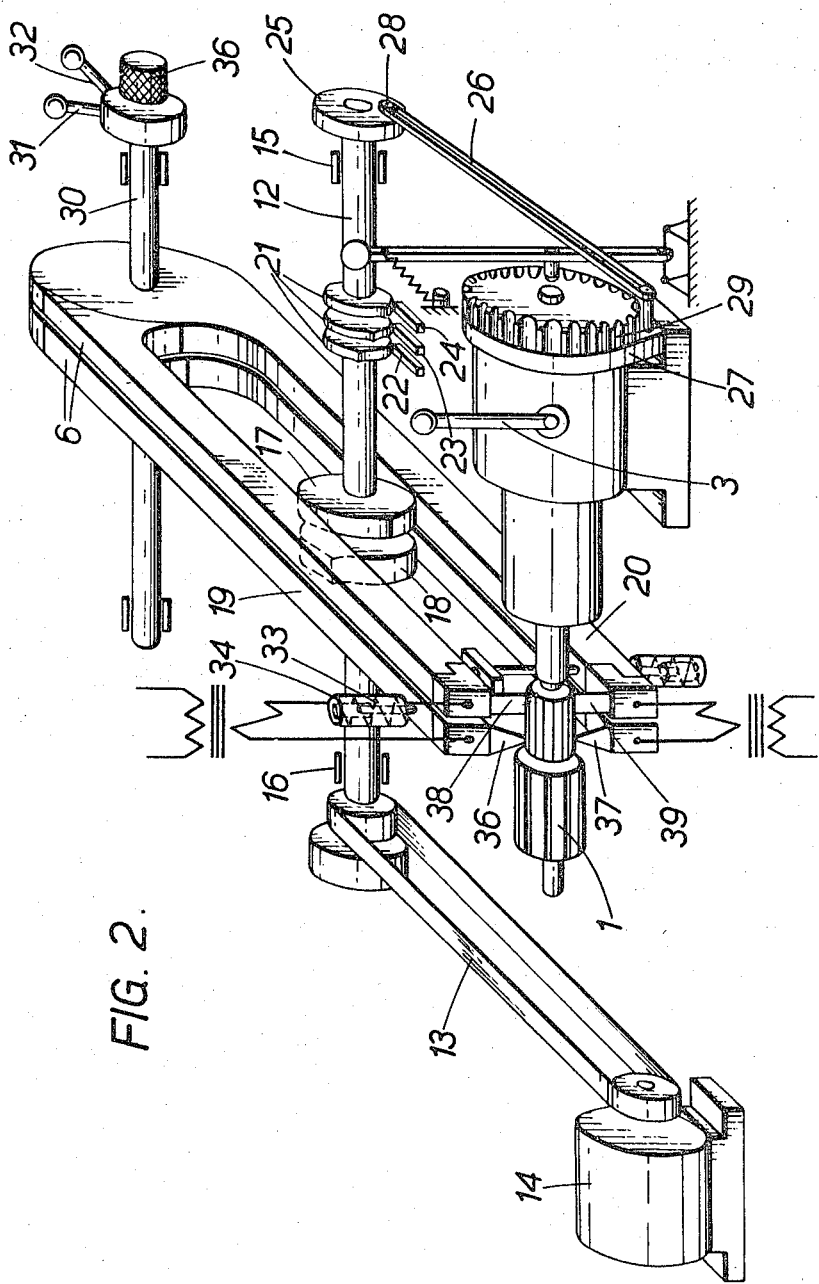
FIG. 2 shows a perspective view of the welding apparatus according to the invention.

A complete rotor 1 consisting of the wound armature stampings, the shaft and the commutator may be seen in FIGURE 2. The shaft end facing the commutator is clamped into a turret clamp 2 as seen in FIGURE 1. The releasing and clamping of the turret clamp is carried out by means of a lever 3. By rotating this lever in the direction of the arrow the eccentric member 4 is pressed against sleeve 5 which slides the cone sleeve 8 against spring 9 which is thus placed under tension. The turret clamp 2 is opened and the clamped workpiece may be removed or a new workpiece may be inserted. The length of the shaft end inserted into the turret clamp 2 may be limited by means of a stop rod 10 and a nut 11.

The advancing from bar to bar as well as the lowering and raising of the electrodes and the control of the welding program is operated from a shaft 12 extending between the electrode arms 19 and 20 substantially at their central part. The shaft 12 is driven over a belt 13 by a motor 14. The shaft 12 rotates in bearings 15 and 16.

Two cam wheels 17 and 18 raise and lower the electrode arms 19 and 20 during each half shaft turn. Shaft 12 also carries three cam wheels 21. One of these cam wheels operates the switch 22 which controls the connection of the welding current. A switch 23 is operated by another cam wheel 21 and controls the counting device which counts the weldings. Another switch 24 operated by the third cam disc 21 interrupts the automatic operation after completing the set noumber of weldings. On the right end of shaft 12 a crank disc 25 is mounted and a push rod 26 is connected to the crank disc 25 so as to be eccentrically adjustable. This push rod 26 is connected at its other end to an eccentric point of a carrier plate 27. With each advancing movement of the push rod 26 the carrier plate 27 is rotated by the graduation angle of the bar so that the rotor which is clamped to the same shaft is rotated by the particular distance of the division. During each reversing motion the carrier disc 27 moves freely on the shaft. By changing the eccentric location of the push rod bearing 28 on the crank disc 25 the advancing angle may be adjusted to the corresponding divisions of the bars. The idler pulley 29 which is coupled to the carrier disc 27 in the advancing movement is provided at the circumference with an indexing device which may be released for adjusting purposes. The indexing device provides an exact welding point position on the bar. For each commutator division the mounting of a corresponding indexing device is necessary.

The double electrode arms 6 are mounted on the eccentric shaft 30. By means of the hand wheel 36 the eccentric or mounting shaft 30 and with it the electrode arms 6 may be moved in the axial direction of the shaft 30. Thus the electrode may be moved lengthwise of the bar to be welded and directed to the welding point to be formed. By means of lever 31 the eccentric shaft 30 may be turned in the range of 90° but first the clamping lever 32 must be released. Thus the electrode arms 6 may be moved by the amount of the eccentricity forwards or backwards in a direction transverse to the axis of the rotor 1, and be used thus for welding commutators with either an even or an uneven number of bars. The tension spring 33 may be compressed more or less strongly, by rotating a nut 34, so that the welding force which is applied may be correspondingly increased or reduced.

The welding current is supplied simultaneously in two paths. One welding current flows through the upper electrode pair while the other welding current feeds the lower electrode pair. The two welding currents can naturally be supplied also from a single transformer in contrast to the supply as shown in FIGURE 2. The electrodes 36 and 37 are designed for the actual welding of the coil ends to the bars, while the electrodes 38, 39 are pressed as contact electrodes on the bars. All the electrodes may be stopped at the correct operating level depending on the diameter of the commutator by conventional clamping means not shown in the drawing.

Although the invention has been described by way of an embodiment it is clear that other forms and modifications may be employed without departing from its scope as defined by the appended claims.

What is claimed is:

1. Apparatus for welding the coil ends of a rotor to the commutator bars, comprising in combination
a pair of upper and lower electrode arms,
a pair of upper and lower welding electrodes mounted at one end of said electrode arms,
means for supporting said upper and lower electrode arms at the other end for movement relative to each other to vary the spacing between said upper and lower pairs of electrodes,
means for clamping and rotatably supporting the shaft of the rotor in position between said upper and lower pairs of electrodes,
said upper and lower pairs of electrodes engaging each a commutator bar disposed diametrically opposite each other on said commutator,
means for supplying an electric current simultaneously to said upper electrodes and to said lower electrodes,
said upper electrodes being arranged for welding circuit completion through a selected first bar on said commutator,
said lower electrodes being arranged for welding circuit completion through a second bar on said commutator located in diametrically opposed, vertically spaced, electrically isolated relationship with said first bar for simultaneous welding of selected rotor coil ends on said rotor to said first and second bars on said commutator under one of said upper and one of said lower electrodes whereby the oppositely directed welding pressures exerted by said upper and lower electrodes are approximately balanced.

2. The apparatus of claim 1 wherein the commutator has an even number of commutator bars comprising bars disposed exactly diametrically opposite each other, the oppositely directed welding pressures exerted by said upper and lower pairs of electrodes completely balancing each other during the welding operation.

3. The apparatus of claim 1 wherein the commutator has an uneven number of commutator bars comprising bars disposed substantially diametrically opposite each other and deviating by approximately 5° from an 180° position on the commutator, the oppositely directed welding pressures exerted by said upper and lower pairs of electrodes being substantially balanced by each other, a small pressure component being absorbed by said supporting means of the rotor shaft.

4. The apparatus of claim 1 wherein one electrode of each of said upper and lower electrodes is a welding electrode for welding at least one coil end to a commutator bar and the other electrode of each of said upper and lower electrodes is a contact electrode for pressing against said commutator bar to provide a transfer of electric current for said welding circuit completion.

5. The apparatus of claim 1 wherein the supporting means for said upper and lower pairs of electrode arms is an excentrically journalled shaft whereby rotation of said shaft moves said pairs of electrodes selectively forward and backward transverse to the axis of said rotor for adjusting the electrodes to the position of the commutator bars.

6. The apparatus of claim 1 including a driven cam shaft extending between said pairs of upper and lower electrodes, two cam wheels supported on said cam shaft within the space between said pairs of electrode arms each engaging at opposite peripheral points an upper and lower arm of said electrodes for moving the electrodes relative to the rotor during rotation of said cam shaft.

7. The apparatus of claim 6 including a plurality of outer cam wheels fixed to said cam shaft and mounted relative to associated corresponding electric current switching elements for operative engagement therewith, one of said outer cam wheels being arranged to control the current supply to said electrodes, a second one of said outer cam wheels arranged to control a counting device for the number of weldings, and a third one of said outer cam wheels being arranged to control the termination of the welding cycle after completion of the last welding.

8. The apparatus of claim 7 including an excentric disc mounted at one end of said cam shaft and a push rod connected to said excentric disc and to said rotatable supporting means of said rotor shaft to turn said supporting means of said rotor shaft upon rotation of said cam shaft by the distance between the commutator bars.

9. The apparatus of claim 8 wherein said mounting shaft is movable axially of said rotor together with said pairs of electrode arms to adjust said electrodes axially of said rotor.

References Cited

UNITED STATES PATENTS

| | | | |
|---|---|---|---|
| 553,923 | 2/1896 | Lemp | 219—116 |
| 2,342,117 | 2/1944 | Brown et al. | 219—107 X |
| 3,320,401 | 5/1967 | Zachry et al. | 219—117 X |
| 2,232,450 | 2/1941 | Hagedorn | 219—86 |
| 2,278,104 | 3/1942 | Harter | 219—86 |
| 3,045,103 | 7/1962 | Warner | 219—78 |
| 3,205,337 | 9/1965 | Hiemenz et al. | 219—87 |

FOREIGN PATENTS 603,486   10/1934   Germany.

RICHARD M. WOOD, *Primary Examiner*,

B. A. STEIN, *Assistant Examiner*,